US008080273B2

(12) United States Patent
Lykomitros et al.

(10) Patent No.: US 8,080,273 B2
(45) Date of Patent: Dec. 20, 2011

(54) RICE SNACK CHIP WITH HIGH RATE OF VISUAL INCLUSIONS MADE ON TORTILLA SHEETING EQUIPMENT

(75) Inventors: Dimitris Lykomitros, Dallas, TX (US); Dianne Renee Ripberger, Plano, TX (US)

(73) Assignee: Frito-Lay North America, Inc., Plano, TX (US)

( * ) Notice: Subject to any disclaimer, the term of this patent is extended or adjusted under 35 U.S.C. 154(b) by 758 days.

(21) Appl. No.: 11/873,904

(22) Filed: Oct. 17, 2007

(65) Prior Publication Data

US 2009/0104333 A1 Apr. 23, 2009

(51) Int. Cl.
*A21D 13/00* (2006.01)
*A23L 1/164* (2006.01)
(52) U.S. Cl. .................. 426/560; 426/620
(58) Field of Classification Search .............. 426/560
See application file for complete search history.

(56) References Cited

U.S. PATENT DOCUMENTS

| | | | | |
|---|---|---|---|---|
| 4,521,436 | A * | 6/1985 | Lou et al. | 426/104 |
| 6,149,965 | A | 11/2000 | van Lengerich et al. | |
| 6,432,465 | B1 * | 8/2002 | Martines-Serna Villagran et al. | 426/549 |
| 7,189,424 | B2 * | 3/2007 | Gorski | 426/560 |
| 7,507,431 | B2 * | 3/2009 | Faa et al. | 426/549 |

OTHER PUBLICATIONS

Purcell Mountains webpage Sep. 2010.*
Nu-Bake webpage-, http://www.ribus.com/Bakery_Presentation.pdf May 11, 2011.*
Yu, Li Juan; "Noodle Dough Rheology and Quality of Instant Fried Noodles", Department of Bioresource Engineering, MacDonald Campus, McGill University, Montreal Quebec (Aug. 2003).
Young, Timothy J.; U.S. Statutory Invention Registration No. H2095H (Jan. 6, 2004).
Niness, Kathy R.; Nutritional and Health Benefits of Inulin and Oligofructose "Inulin and Oligofructose: What are they?", The Journal of Nutrition (1999).
Murray, J.C.F.; "Cellulosics" Handbook of Hydrocolloids (2000).
Blachford, Stacey L., Gale Group, Inc.; How Products are Made. "Cereal." http://www.enotes.com/how-products-encyclopedia/cereal (2002.).
Fletcher, Anthony; "New Innovations in Texture" http://www.foodnavigator.com/news-by-product/news.asp?id=52990&idCat=19&k= (Jun. 22, 2004).
"Frutafit inulin & frutalose FOS: prebiotic dietary fibers" http://www.foodnavigator.com/news-by-product/productpresentation.asp?id=550&k=frutafit-inulin-frutalose (Unknown).
Marsilli, Ray; "Texture & Mouthfeel: Making Rheology Real", Food Product Design (Aug. 1993).

(Continued)

*Primary Examiner* — Humera Sheikh
*Assistant Examiner* — Lela S Williams
(74) *Attorney, Agent, or Firm* — Bobby W. Braxton; Colin P. Cahoon; Carstens & Cahoon, LLP

(57) ABSTRACT

A method and formulation are disclosed for using a mixture of inulin and surfactant to overcome adhesive and viscoelastic problems associated with using tortilla sheeters for processing rice-based dough to make rice crisps. The inulin decreases viscoelasticity whereas the surfactant decreases adhesiveness. The additive decouples the relationship between water content and the adhesiveness and viscoelasticity of the dough, allowing water content to be used to control other product variables such as product moisture content and oil take-up.

17 Claims, 2 Drawing Sheets

OTHER PUBLICATIONS

Bourne, Malcolm; Dr. Malcolm Bourne's Food Texture & Viscosity, http://www.texturetechnologies.com/texture_profile_analysis_html (Unknown).

Ennis, M.P., et al.; "Milk Proteins" Handbook of Hydrocolloids, pp. 189-217, (2000).

* cited by examiner

RICE SNACK CHIP WITH HIGH RATE OF VISUAL INCLUSIONS MADE ON TORTILLA SHEETING EQUIPMENT

BACKGROUND

1. Technical Field

The present invention relates to an improved method for processing dough to form a rice crisp with visual inclusions. More specifically, this invention relates to a rice-flour-based dough formulation that allows the dough to be processed on tortilla sheeting equipment.

2. Description of Related Art

Rice snacks are well-known in the art. These snacks are very popular in Japan and have become increasingly popular in the United States because of their nutritional appeal. Additionally, rice snacks with visual inclusions are becoming increasingly popular for the same reason. The visual inclusions consist of whole pieces of rice or grain that are imbedded in the cake and that are visible within and on the snack. Health-conscious consumers are expressing a greater demand for rice-based snacks, especially alternatives to the more traditional puffed rice cake, such as rice crisps and/or rice chips. Thus, there is a need for expanding the available methods for producing rice-based snacks.

There are many drawbacks associated with the traditional method of manufacture. The first drawback is the high cost associated with the production equipment an operation. For example, the equipment used to form a traditional rice cake must be capable of precise and timed expansion as well as being able to heat its contents to high temperatures at high pressures. Yet another drawback is that the traditional method of manufacture is very time intensive. Each cake manufactured must go through the lengthy compression and heating stages which reduce total throughput. Finally, the high temperatures and pressures of the traditional process limit the amount of visual inclusions that can be included in the rice cake, as the high temperatures and pressures are very degrading.

There have been many different methods proposed for making rice snacks with visual inclusions. Note, however, that such prior art methods typically relate to puffed-rice cakes, rather than sheeted-dough-derived rice crisps or chips. For example, U.S. Pat. No. 5,871,793 provides a method wherein pre-puffed rice is coated with a binder agent such as a water-based mixture and heated with ultrasound energy until bonded. This overcomes the high temperatures and pressures associated with traditional methods that limit the amount of visual inclusions in the cake.

Because of the high capital costs associated with the production of rice snacks, there exists a need for a novel method that allows for the production of rice snacks on cheaper or more readily available equipment. An alternative method for producing rice snacks is by using existing tortilla sheeting equipment for processing and sheeting rice-based dough.

Tortilla sheeters, hereinafter "sheeters," typically comprise two or more rollers. Sheeters can vary in size and can be as large as, or larger than, about 9 feet in length. One or more pairs of rollers are spaced apart to form a gap between the rollers called a nip size. The thickness of the dough can be adjusted by adjusting the nip size. The two rollers rotate in opposite directions, and the dough passes through the gap. The dough is then collected by a third roller or by a conveyor that transports the sheeted dough for subsequent processing, i.e. cutting, puffing, frying, baking, etc. A stripping wire or peeling wire is often held across one of the rollers (the roller upon which the dough adheres immediately after passing through the gap area) to help dislodge the dough or dough pieces from the roller.

Many factors can affect the consistency of a dough sheet operation. These include, but are not limited to, amount and type of each ingredient, ingredient distribution within the dough, water content, nip size, the speed of the rollers, and the energy absorbed by the dough from the rollers. Downstream processing such as cutting, frying, etc, as well as the final product quality is likewise dependent on dough sheet properties being precisely controlled. An inconsistent sheet thickness or size can result in erratic product taste, texture or appearance. Thus, to consistently produce a quality product, the sheeting operation must yield dough sheets of consistent size and thickness.

There are many problems with using corn masa sheeters in the processing of a rice-water dough to manufacture rice or grain cakes with visual inclusions. Most of these problems arise from the interaction and competing nature of three important properties of the rice-water mixture that forms the dough: 1) adhesiveness, 2) cohesiveness, and 3) viscosity or viscoelasticity, depending on the liquid-like and/or solid-like nature of the dough (for example, if the dough is liquid-like, its viscosity will be physical property of interest; if the dough is more solid-like or polymer-like, its viscoelasticity will be the physical property of interest). The dough, for example, must be viscous enough to form tightly-bonded dough. If the dough's viscoelasticity, on the other hand, is too low, the resulting product will have a compromised texture (the product could, for example be too hard, too thin, and/or too glossy). If the viscoelasticity, however, is too high, the rice dough will resist the sheeting pressures, increase the mechanical stress, and increase the risk of mechanical failure. For example, possible mechanical issues might include: breaking the peeling wire; stalling, overheating, and/or tripping the driving motors; buckling of the dough before the rollers; buckling of the rollers; increasing the shear stress and/or or work input to the dough beyond the intended amount. Undesired or unanticipated increases in shear stress and/or work input to the dough could potentially be catastrophic to the final product, as well as to the machinery, as differential sheeting equipment is generally designed for relatively low shear stress. Because some tortilla rollers are as large as, or larger than, 9 feet in length, the buckling resulting from highly-viscoelastic dough can be severe. Additionally, as discussed above, other processing operations as well as the final product are dependent on uniform sheeting. Buckling results in a non-uniform sheet which creates processing problems as well as variability in final product attributes.

A large viscoelasticity in dough could normally be overcome by supplying additional power to the rollers to limit the buckling. However, this option is not available when producing rice cakes with visual inclusions. The inclusions provide an upper limit on the power supplied to the sheeter rollers; too much power will result in breaking the intact rice grains that make up the visual inclusions.

Similar to the dough's viscosity and viscoelasticity requirements, the rice dough must be cohesive and adhesive enough to form a dough. However, prior art rice dough that is cohesive enough and adhesive enough to properly form a dough will usually be too adhesive for processing and will adhere to the surface of the rollers, causing jams, undesirably-rough surface, or tears in the sheeted dough.

Finally, another problem that arises is that water content cannot be adjusted to control water dependent processing variables because the water content is determined by the target dough rheology. For example, the dough must be cohesive enough to support the visual inclusions within the dough, while the viscoelasticity of the dough must be tightly controlled to minimize buckling of the rollers. Because cohesiveness and viscoelasticity are both functions of water content, the target viscoelasticity and target cohesiveness of the dough are achieved by adjusting the water content of the water-rice dough. Once water content is set to yield a desired rheology, it cannot, without the teachings of the present invention, be independently controlled to affect other processing results that are likewise factors of water content such as oil take-up and expansion of the visual inclusions. Thus, the viscoelasticity, adhesiveness, and cohesiveness of the rice-water mixture are so coupled that none can be advantageously compromised enough to make the dough suitable for processing on existing tortilla sheeters. Consequently, there is a need to decouple the viscoelasticity, adhesiveness, and cohesiveness of the rice-water mixture to allow the dough to be processed on tortilla sheeters without compromising final product quality.

SUMMARY OF THE INVENTION

A method and formulation are disclosed for using a mixture of inulin and surfactant (such as monoglyceride, lecithin, etc.) to overcome adhesive, cohesive, and viscoelasticity problems associated with using tortilla sheeters (e.g. corn masa dough sheeters) for handling and sheeting rice dough in making rice snacks, including crisps and/or chips. Such problems include buckling of the sheeting rollers due to highly-viscoelastic doughs as well as tearing of the dough sheets due to high adhesiveness. The inulin decreases viscoelasticity and can range from about 1% to about 10% by weight of the dough, and preferably from about 2% to about 6% by weight of the dough. The surfactant (preferably monoglyceride, although lecithin or other surfactants are acceptable) decreases adhesiveness and can range from about 0.01% to about 4% by weight of the dough, and preferably from about 0.1% to about 2% by weight of the dough. Additionally, the additive decouples the relationship between water content and the adhesiveness and viscoelasticity of the dough, allowing water content to be used to control other product variables such as product moisture content and oil take-up. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

REFERENCE NUMERALS

Figure 1:
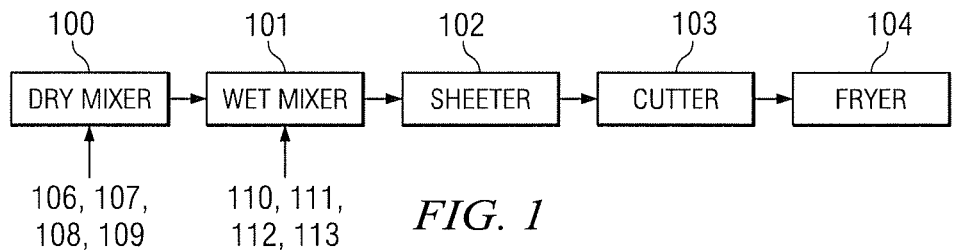
FIG. 1 is a schematic diagram of a rice cake manufacturing scheme according to one embodiment of the current invention.

100—dryer mixer
101—wet mixer
102—tortilla sheeter
103—cutter
104—fryer
106—rice
107—masa flour
108—pregelantinized rice flour (amylose)
109—sesame seeds (visual inclusions)
110—corn oil
111—inulin
112—monoglyceride
113—water
202—rice dough mixture
203—visual inclusions
204—dough pile
210, 214—rollers
212—roller-feeding conveyor
218—nip size
222—dough sheet
228—final dough sheet thickness
232—exit conveyor

DETAILED DESCRIPTION

While the invention has been particularly shown and described with reference to a preferred embodiment, it will be understood by those skilled in the art that various changes in form and detail may be made therein without departing from the spirit and scope of the invention.

In one embodiment of the current invention, the base rice dough is made of rice, intact rice grains as visual inclusions, and water. It should be noted that while rice is the base ingredient for most of the embodiments discussed, grains, oats, corn, and a combination of these and other grains can be used in place of or in supplement to the rice. Fruit powders and/or vegetable powders can also be used in doughs for processing as described herein. Likewise, although intact rice grains are typically discussed as the visual inclusions, other cereal grains or particles, such as whole grains, rice pieces, bumped rice, pellets, seeds, etc., either intact, visibly-sized pieces, or in large clumps, can also be used to serve as visual inclusions. Preferably, the visual inclusions are visible particles (i.e. whole grains or portions of grains) of bumped brown rice, although other variations of healthy grains, legumes, fruit pieces, and bean pieces can be substituted. If a variety of particles are used, it is preferable for the majority of the particles, or at least 35% or greater by weight, to be rice. Bumped rice is typically an intermediate form of rice between a par-cooked (partially-cooked) rice grain and crisp rice. Bumped rice grains are derived by partially-cooking rice grains, dehydrating the grains, heating them so that the outer layer plasticizes/hardens, and then slightly pressing or "bumping" them using a flaking roller. The visual inclusions in the final dough can range from about 2% to about 40% by weight, preferably from about 5% to about 30% by weight, and even more preferably from about 10% to about 24% by weight of the dough.

In one aspect of this invention, it has been found that the addition of from about 0.1% to about 6% by weight pregelatinized starch, such as pre-cooked rice flour, releases amylase compounds that will bind the inclusions to the dough matrix. However, such addition also increases both the adhesiveness and viscoelasticity of the dough. This can lead to the aforementioned processing problems such as the dough adhering to the sheeter rollers, which could cause tears in the sheets, or cause the rollers and/or the dough to buckle. As discussed, the buckling can cause non-uniformity in the sheet thickness as well as other problems. These problems become even more exaggerated as the nip size, herein defined as the inter-gap distance, decreases. Thus, there is a need for a way to counter the undesirable increases in adhesiveness and viscoelasticity, which increases tend to accompany the addition of pre-gelatinized starch.

In another aspect of this invention, it has been found that the addition of fructo-oligosaccharides to the dough at a concentration of about 1% to about 10% by weight, and preferably about 2% to about 6% by weight—in particular, inulin (and preferably short-chained inulin with an average of about 9 or 10 fructose units)—reduces the viscoelasticity while having little to no effect on the stickiness or adhesiveness. Thus, inulin provides a method for controlling viscoelasticity of the dough independently from water content. Additionally, short chained inulin such as fructose oligosaccharide has nutritional benefits. For example, inulin is a soluble fiber that can have a minimal impact on blood sugar. Inulin is also a prebiotic, meaning it can promote the growth of helpful bacteria in the intestines.

In yet another aspect of this invention, it has been found that the addition of about 0.01% to about 4% by weight, and preferably from about 0.1% to about 2% by weight surfactant—preferably monoglyceride—decreases the stickiness without significantly affecting the viscoelasticity of the dough. Thus, addition of monoglyceride (or other surfactant) provides a method for slightly decoupling the relationship of adhesiveness and water content.

The addition of a mixture of inulin and surfactant decouples the relationship between water content, adhesiveness, and viscoelasticity. The decoupling effect of the mixture has many ramifications. First, an inulin-and-surfactant-containing rice-water mixture can now be processed on tortilla sheeters, for example. As previously discussed, because of the high capital costs associated with traditional rice snack production equipment, being able to process rice dough on existing tortilla sheeters results in large capital savings. Second, a target viscoelasticity can now be achieved independently of water content. The buckling problem encountered when sheeting highly-viscoelastic dough between long tortilla rollers can be eliminated with the addition of a determined amount of inulin. Likewise, the tearing and adhering to the surface of the rollers can now be eliminated and/or controlled with the addition of surfactant, such as monoglyceride or other emulsifier (lecithin, for example). Third, because the aforementioned buckling and adhering problems can be eliminated and/or controlled with the addition of a mixture of inulin and surfactant, independent of water content, other water content dependent variables can be controlled by adjusting the water content of the dough. For example, the moisture content of the dough can be decreased without affecting processability. This allows for the hydration of the inclusions to be controlled. Likewise, oil pickup while frying can be reduced as less moisture has to be driven out of the product.

The invention according to one embodiment will now be discussed in reference to the figures. FIG. 1 is a schematic diagram of a rice crisp manufacturing scheme according to one embodiment of the current invention. Raw materials are first added to the dry mixer 100. Rice 106, masa flour 107, free amylose in the form of pregelatinized brown rice flour 108, and sesame seeds 109 representing the visual inclusions are added to the dry mixer 100. The raw materials are mixed and then transferred to the wet mixer 101. In the wet mixer 101, water 113, vegetable oil 112, surfactant 111, and inulin 110 are mixed.

The amount of inulin added depends on the desired viscoelasticity and can vary between about 1% to about 10% by weight, preferably between about 2% to about 6% by weight, and even more preferably between about 2% to about 3% by weight of the dough mixture. The inulin used has a degree of polymerization ("DP")—i.e. the number of fructose units—generally ranging from 2 to 60 units. In a preferred embodiment, the inulin is short-chained inulin (or oligofructose) with an average DP of about 9 or 10.

The amount of surfactant added depends on the adhesiveness required of the dough and can vary from about 0.01% to about 4% by weight, preferably from about 0.1% to about 2% by weight, and even more preferably from about 0.5% to about 1% by weight of the dough. In one embodiment, the surfactant is a monoglyceride such as Dimodan, which is available from Danisco of New Century, Kans. The vegetable oil component preferably ranges from about 1% to about 2% by weight of the dough mixture.

After the ingredients are mixed in the wet mixer 101, the dough is sheeted on the tortilla sheeter, preferably to a thickness from about 100 microns to about 2,000 microns (0.1 mm to 2.0 mm). Because of the inulin-surfactant mixture, the dough can be sheeted on tortilla sheeters without the sheeters buckling or the sheet tearing. Once sheeted, the dough sheet is conveyed to cutters 103 which cut the sheets into pieces suitable for frying. The cut pieces are then fried in a fryer 104 wherein the rice becomes puffed.

Figure 2:
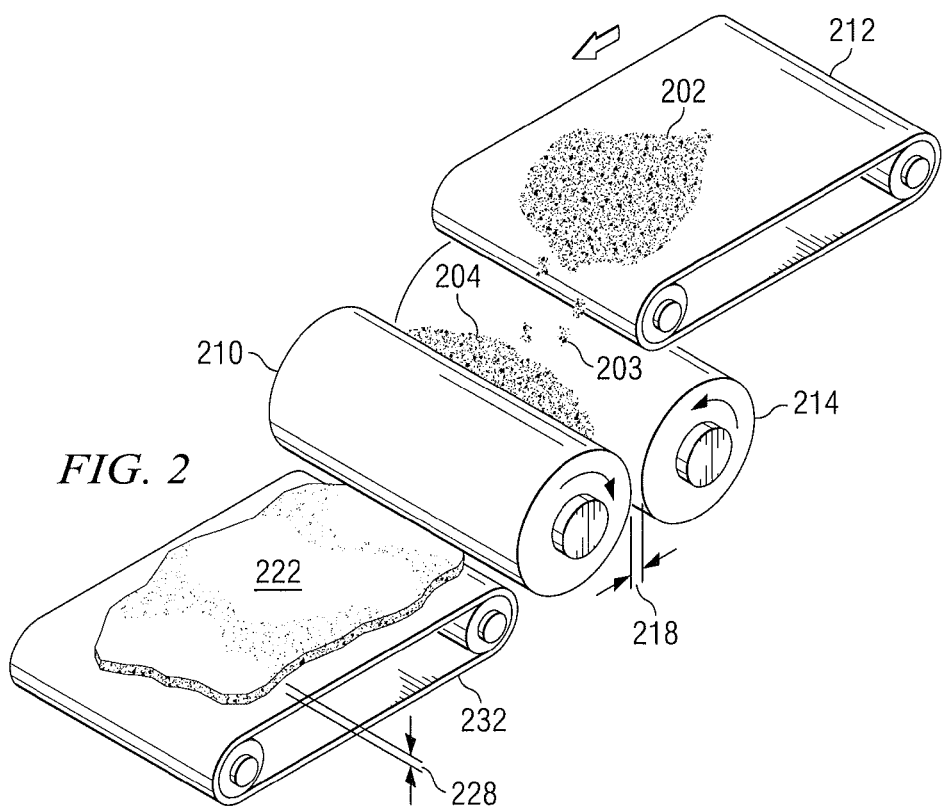
FIG. 2 is a side perspective drawing of a tortilla sheeting apparatus.

FIG. 2 is a side perspective drawing of a tortilla sheeting apparatus. The dough 202 is placed on a conveyor 212. The conveyor 212 feeds the dough to the center of the rollers 210, 214. The rollers 210, 214 are separated by a nip size 218, which determines the dough sheet thickness. The rollers 210, 214 rotate in opposite directions and can rotate independent of one another. The dough 202 passes through the rollers where it is collected by the exit conveyor 232. Because the dough has been treated with a mixture of inulin and surfactant, the dough is adhesive enough to form a dough, but not so adhesive that it adheres to the surface of either roller 210, 214. Additionally, because the dough has been treated with the claimed mixture, the dough has a lowered viscoelasticity which does not cause buckling in the rollers 210, 214.

The following five dough compositions were examined for various mechanical and rheological properties to illustrate the benefits (i.e. decoupling the relationship between water content, adhesiveness, and viscoelasticity) of adding inclusions and surfactant in accordance with the present invention:

TABLE 1

Weight Compositions of Sample Doughs Analyzed For Hardness, Adhesiveness, Cohesiveness, and Viscoelasticity.

| Ingredient | Cell 1 With inclusions and NO emulsifying system, high moisture | Cell 2 With NO inclusions and NO emulsifying system | Cell 3 With NO inclusions and emulsifying system | Cell 4 With inclusions and NO emulsifying system | Cell 5 With inclusions and emulsifying system |
|---|---|---|---|---|---|
| Bumped brown rice | 16.9% | 0.0% | 0.0% | 18.4% | 17.9% |
| Sesame seeds | 2.1% | 0.0% | 0.0% | 2.3% | 2.2% |
| Corn oil | 1.3% | 1.8% | 1.7% | 1.4% | 1.4% |
| Monoglyceride | 0.0% | 0.0% | 0.4% | 0.0% | 0.3% |
| Inulin | 0.0% | 0.0% | 2.7% | 0.0% | 2.2% |
| Basic rice dough constituents including water | 79.7% | 98.2% | 95.2% | 77.9% | 75.9% |
| Total | 100.0% | 100.0% | 100.0% | 100.0% | 100.0% |
| Moisture Content | 39.90% | 42.88% | 41.91% | 35.62% | 35.67% |

If we measure various mechanical and rheological properties (as shown in FIGS. 3-6) for the above-mentioned dough compositions, and then compare the observed values for the various properties across the above-mentioned dough compositions, we can correlate: a) changes in various mechanical and rheological properties, with b) changes in composition. The basic rice dough constituents for the experiment compositions shown above included, in addition to water, various rice flours and other flours: waxy brown rice, long grain coarse white rice flour, pregelatinized brown rice flour, medium grain brown rice flour, masa flour. A 60/40 weight ratio of flour-to-water (flour/water) was maintained throughout the five sample doughs described in Table 1. Note, however, that the particular flours used and the general flour-to-water weight ratio may vary between acceptable embodiments, depending upon the desired taste, texture, and nutritional traits. The present invention relates to how the additional constituents (the ones other than the basic constituents) affect the dough's processing traits.

For example, we can compare the adhesion, cohesion, viscoelasticity, and hardness values for the compositions described in Cells 2 (no emulsifying system) and 3 (includes emulsifying system) to show the effect of adding emulsifier and inulin. The mechanical and rheological properties of the dough compositions of Cells 4 and 5 can be compared to show the effect of adding an emulsifying system into a rice dough with inclusions. The dough composition of Cell 1 is similar to that of cell 4, but with higher moisture content. Thus, the mechanical and rheological properties of the dough composition of Cell 1 can be compared to the properties of the dough composition of Cell 4 to show what would happen if water were added to reduce hardness, as opposed to the addition of the emulsifying system of the present invention.

Note that the dough formulation for cell 5 serves as one example composition in accordance with a preferred embodiment of the present invention. This composition enables rice dough with a high rate of visual inclusions—which dough otherwise could not be processed on industrial-sized tortilla sheeters—to be capable of processing on industrial-sized tortilla sheeters. The composition in weight percent for cell 5 is as follows: 17.9% bumped brown rice visual inclusions; 2.21% sesame seed visual inclusions; 1.39% corn oil; 0.34% emulsifier (or surfactant); 2.21% fructo-oligosaccharide (inulin); 75.9% basic rice-dough constituents including water.

Note, however, that the exact composition may vary and may depend upon the particular user's needs and the user's unique technical application. Stated more simply, suitable rice-based dough with visual inclusions in accordance with the present invention may have a composition such as: 20% visual inclusions; 1.4% oil; 0.3% emulsifier; 2.2% inulin; and the remainder (about three-fourths or 75%) comprising the basic dough components, such as flours/starches (the majority of which will be rice-based) and water. Even more generally, acceptable dough formulations will have, roughly: half of the dough comprised of a rice-based flour or component; a fifth of the dough comprised of visual inclusions; a tenth of the dough (or less, preferably 6% or lower) a rheology-standardizing component comprised of oil, emulsifier, and oligosaccharide; and water for the remainder (about a fifth to a third of the dough).

Figure 3:
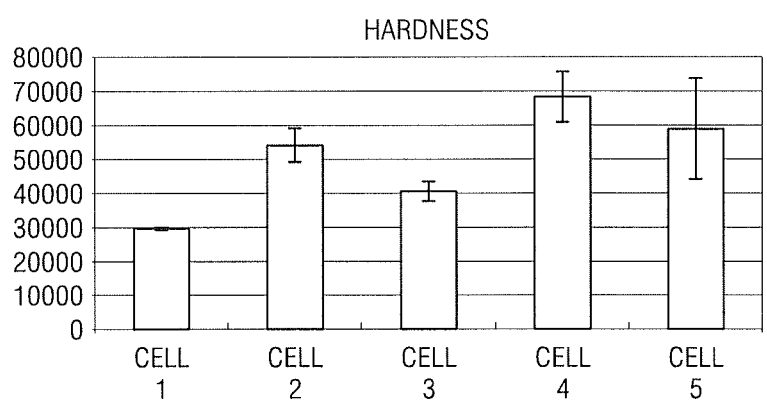
FIG. 3 is a bar chart of the hardness values (measured in grams of weight resistance) of five experimental dough compositions.
Figure 4:
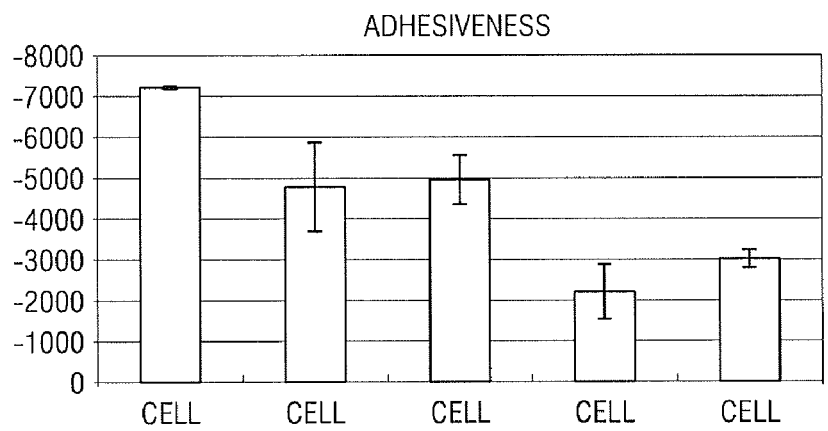
FIG. 4 is a bar chart of the adhesiveness values (measured in Newton-seconds) of the aforementioned five experimental dough compositions.
Figure 5:
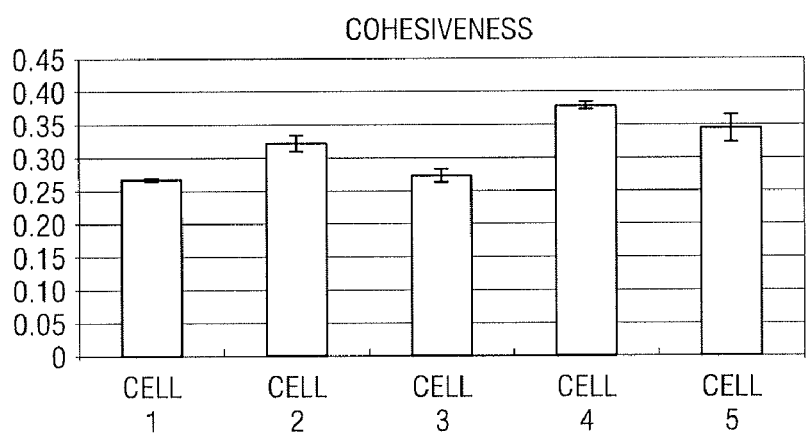
FIG. 5 is a bar chart of the cohesiveness values (which are unit-less) of the aforementioned five experimental dough compositions.
Figure 6:
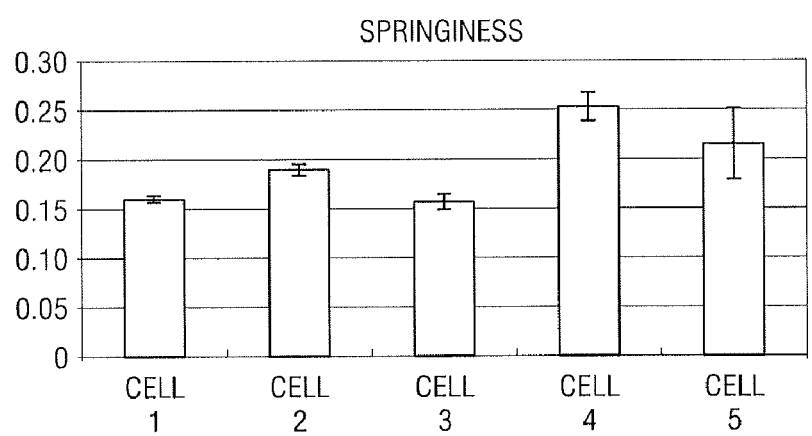
FIG. 6 is a bar chart of the springiness values (which are unit-less) of the aforementioned five experimental dough compositions.

Texture Profile Analysis (Using a TA-XT2 instrument), which is a standard analytical procedure used by those skilled in the art, yielded the values shown in FIGS. 3 through 6. FIG. 3 is a bar chart of the hardness values (measured in grams of weight resistance) of the five experimental dough compositions referred to as cells 1 through 5. FIG. 4 is a bar chart of the adhesiveness values (measured in Newton-seconds) of the aforementioned five experimental dough compositions. FIG. 5 is a bar chart of the cohesiveness values (which are unit-less) of the aforementioned five experimental dough compositions. FIG. 6 is a bar chart of the springiness (viscoelasticity; viscoelastic resistance) values (which are unit-less) of the aforementioned five experimental dough compositions.

Texture Profile Analysis (TPA) is a very common method used for determining textural properties of materials. The text is carried out in a Texture Analyzer (or Instron) instrument, using parallel-plate geometry. A cylinder of fixed dimension is cut from the material under investigation (using a special 'cookie cutter'), and the cylinder is placed between two parallel plates in the TA-XT2 instrument. The cylinder is compressed and decompressed, the compressed and decompressed a second time. The plates move at a set speed (therefore time and distance traveled are analogous), and the instrument records the resisting force exerted to the plates. When the cylinder is first compressed, a positive force is recorded, as the material resists compression. When the plate starts moving back, a negative force will be recorded—if the material is glue-like and resists releasing from the plates. The second cycle is identical to the first (with respect to cycle steps). Several rheological properties can be derived from this method including: hardness, adhesiveness, cohesiveness, and springiness (or viscoelasticity; viscoelastic resistance).

Hardness is indicated by measuring the maximum resistance force as the material is compressed. The units are typically N (Newtons) or g (grams).

Adhesiveness is indicated by measuring the work required to separate the retracting plate from the material. The magnitude is negative, because the force is negative (the material is pulling back). The units are typically work units (such as Newton-meters) or work-related units such as N-s (Newton Seconds) or g-s (gram-seconds).

Cohesiveness refers to the rate at which the material disintegrates (or holds together) under mechanical action. It is defined as the ratio of the work done for compression the first time over the work done for compression the second time. The measure has no units, since it is a ratio.

Springiness (or: viscoelasticity, viscoelastic resistance, memory) refers to the degree to which the material recovers its original shape during the time that elapses between the end of the first cycle and the beginning of the second. It is indicative of the material's resistance to deformation and its affinity for returning to its original geometry. For example, dough with high springiness or viscoelastic resistance will exhibit high resistance to deformation, and it will therefore require a relatively high degree of work input to sheet. Conversely, dough with low springiness or viscoelastic resistance will exhibit low resistance to deformation, and it will therefore require a relatively low degree of work input to sheet. Springiness is also a number with no units, as it is a ratio of the rebound distance over the compression distance. Springiness (viscoelasticity, viscoelastic resistance, memory) is also equal to the ratio of the compression times, so long as the velocities of the parallel plates during both cycles are the same.

Referring to the hardness values from FIG. 3, it can be seen that addition of the emulsifying system can significantly reduce the hardness of the dough in simple rice doughs (cell 2 vs cell 3). The same effect is true for cells with inclusions, albeit of smaller magnitude (cell 4 vs cell 5). Adding water (cell 1) decreases hardness.

Referring to the adhesiveness values from FIG. 4, adding water (cell 1), however, increases adhesiveness, which shows why using water for reducing the hardness is problematic. It can be seen that in both plain rice dough compositions (cell 2 vs cell 3) and rice dough compositions with inclusions (cell 4 vs cell 5), addition of the emulsifying system has little to no effect on adhesiveness. Unlike the case of cell 1 (water), adhesiveness and hardness have been decoupled by the emulsifying system.

Referring to the cohesiveness values from FIG. 5, adding the emulsifying (or surfactant, more generally) system can be seen to marginally reduce cohesiveness in both plain rice doughs (cell 2 vs cell 3) and in rice doughs with inclusions (cell 4 vs cell 5). Less-cohesive dough will develop lower shear stresses when compressed between the sheeters, thus reducing the breakage of the particulate inclusions (in this case: bumped rice and sesame seeds).

Referring to the springiness values (or viscoelastic resistance values) from FIG. 6, adding the emulsifying system can be seen to consistently reduce the springiness in both plain rice doughs (cell 2 vs cell 3) and in rice doughs with inclusions (cell 4 vs cell 5). This emulsifying system therefore reduces the amount of work input required to sheet the dough—and therefore makes it possible to create thinner product slices—because of the decrease in the degree of rebound exhibited by the dough during and after sheeting.

The above data are summarized in the following table:

| | | Average Value | | | | Standard Deviation | | | | Coefficient of Variation | | | |
|---|---|---|---|---|---|---|---|---|---|---|---|---|---|
| Cell | Moisture Content | Har. (g) | Adh. (N-s) | Spr. | Coh. | Har. | Adh. | Spr. | Coh. | Har. | Adh. | Spr. | Coh. |
| 1 | 39.90% | 29680 | −7270 | 0.161 | 0.270 | 677 | 34 | 0.0035 | 0.002 | 0.0228 | −0.0047 | 0.0215 | 0.0074 |
| 2 | 42.88% | 54109 | −4828 | 0.192 | 0.32 | 5023 | 1082 | 0.0055 | 0.0114 | 0.0928 | −0.224 | 0.0286 | 0.0351 |
| 3 | 41.91% | 40492 | −4981 | 0.156 | 0.276 | 2900 | 591 | 0.0086 | 0.0101 | 0.0716 | −0.119 | 0.0554 | 0.0364 |
| 4 | 35.62% | 68211 | −2132 | 0.255 | 0.383 | 7528 | 651 | 0.0136 | 0.0053 | 0.110 | −305930 | 0.0533 | 0.0138 |
| 5 | 35.67% | 58749 | −3021 | 0.216 | 0.346 | 14812 | 232 | 0.0360 | 0.0188 | 0.252 | −0.0769 | 0.167 | 0.0542 |

While the invention has been particularly shown and described with reference to a preferred embodiment, it will be understood by those skilled in the art that various changes in form and detail may be made therein without departing from the spirit and scope of the invention.

We claim:

1. A method for making a snack product, said method comprising the steps of:
    combining a plurality of visible particles of cereal grains with a rice flour based dough;
    adding a mixture of inulin and a surfactant to said dough, wherein said inulin comprises from about 1% to about 10% by weight, wherein said surfactant comprises from about 0.01% to about 4.0% by weight, and wherein said visible particles comprise from about 2% to about 40% by weight;
    sheeting said dough to form a dough sheet having a thickness from about 100 microns to about 2,000 microns;
    cutting said dough sheet into individual dough pieces; and
    frying or baking said individual dough pieces to produce a plurality of rice crisps having visual inclusions.

2. The method of claim 1 wherein said adding step further comprises the addition of pregelatinized starch ranging from 0.1% to about 6% by weight of the dough.

3. The method of claim 1 wherein said adding step further comprises the addition of vegetable oil in the range of about 1% to about 2% by weight of the dough.

4. The method of claim 1 wherein said visible particles comprise from about 10% to about 24% of the dough by weight.

5. The method of claim 1 wherein said visible particles comprise rice, whole grain, oats, corn, or a combination thereof.

6. The method of claim 1 wherein said visible particles comprise bumped brown rice.

7. The method of claim 1 wherein said inulin ranges from about 2% to about 3% of the total dough mixture by weight.

8. The method of claim 1 wherein said inulin has an average degree of polymerization of about 9 to 10.

9. The method of claim 1 wherein said surfactant ranges from about 0.5% to about 1% of the dough by weight.

10. The method of claim 1, wherein said dough comprises a viscoelasticity, said method further comprising: adjusting the viscoelasticity of said dough by adjusting the concentration of said inulin.

11. The method of claim 1, wherein said dough comprises an adhesiveness, said method further comprising: adjusting the adhesiveness of said dough by adjusting the concentration of said surfactant.

12. The method of claim 1, wherein said dough comprises an adhesiveness, wherein the adhesiveness of said dough is decreased by increasing the amount of surfactant.

13. A sheetable dough comprising:
    a visible particle component derived from cereal grains;
    a rice-based starchy flour component;
    a rheology-standardizing component; and
    an amount of water;
wherein:
    said visible particle component ranges from about 2% to about 40% of the dough by weight;
    said rice-based starchy flour component comprises about half of the dough by weight;
    said rheology-standardizing component comprises up to about one tenth of the dough by weight;
    said amount of water comprises the residual weight percent of the dough; wherein said dough comprises a thickness from about 100 microns to about 2,000 microns;
    and wherein said rheology-standardizing component comprises:
        a cooking oil component;
        a surfactant component; and
        an inulin component.

14. The sheetable dough of claim 13, wherein said rheology-standardizing component comprises:
    a cooking oil component;
    a surfactant component, wherein said surfactant component is a monoglyceride and is about 0.01% to about 4.0% of said dough by weight; and
    a fructo-oligosaccharide component, wherein said fructo-oligosaccharide component is inulin and is about 1% to about 10% of said dough by weight.

15. The sheetable dough of claim 13, wherein:
    said visible particle component comprises about 20% of the dough by weight;
    said rice-based starchy flour component comprises about 47% of the dough by weight;
    said rheology-standardizing component comprises:
        a cooking oil component that is about 1.4% of the dough by weight;
        an emulsifying component, wherein said emulsifying component is a monoglyceride and is about 0.3% of said dough by weight; and
        a fructo-oligosaccharide component, wherein said fructo-oligosaccharide component is inulin and is about 2.2% of said dough by weight;
        and
    said amount of water comprises about 29% of said dough by weight.

16. The sheetable dough of claim 13, wherein said visible particle component comprises bumped brown rice and sesame seeds.

17. The sheetable dough of claim 13, wherein said rice-based starchy flour component is a mixture of masa flour, brown waxy rice flour, rice meal, pre-gelatinized rice flour, and brown rice flour.

* * * * *